United States Patent
Lenguyen

[11] Patent Number: 5,897,283
[45] Date of Patent: Apr. 27, 1999

[54] DUMPING DEVICE

[75] Inventor: David Lenguyen, San Jose, Calif.

[73] Assignee: Gibson Manufacturing Company, East Palo Alto, Calif.

[21] Appl. No.: 08/859,772

[22] Filed: May 21, 1997

[51] Int. Cl.⁶ ..................................................... B60P 1/24
[52] U.S. Cl. .............................. 414/490; 414/421; 298/2; 298/5
[58] Field of Search .................................... 414/490, 444, 414/607, 421; 298/2, 3, 5, 6, 10; 254/113, 120

[56] References Cited

U.S. PATENT DOCUMENTS

| | | | |
|---|---|---|---|
| 944,443 | 12/1909 | Kingsburg | 298/5 X |
| 3,092,418 | 6/1963 | Themascus . | |
| 3,178,228 | 4/1965 | Gibson . | |
| 4,270,786 | 6/1981 | McKinley . | |
| 4,353,596 | 10/1982 | Gibson . | |
| 4,632,461 | 12/1986 | Randolph . | |
| 4,763,907 | 8/1988 | Raymond . | |
| 4,802,709 | 2/1989 | Jones | 414/421 X |

FOREIGN PATENT DOCUMENTS 621246  4/1949  United Kingdom ....................... 298/2

OTHER PUBLICATIONS

Postcard advertisement of Dr® Powerwagen™, manufactured by Country Home Products®, ©1997 CHP, Inc. PW9745.
Brochure advertisement of Dr® Powerwagen™, manufactured by Country Home Products®, ©1998 CHP, Inc. PW9821.

Primary Examiner—Frank E. Werner
Attorney, Agent, or Firm—Cooley Godward LLP

[57] ABSTRACT

A dumping device is disclosed comprising a container rotatably connected to a support structure, so that the axis of rotation of the container is rearward and/or below the center of gravity of the container. A releasable stop prevents the container from rotating forward. At least one actuator is provided which exerts a force forward and above the center of gravity of the container, whereby the speed of rotation of the container may be controlled and the container may be maneuvered between its upright and dumping positions.

11 Claims, 3 Drawing Sheets

5,897,283

DUMPING DEVICE

TECHNICAL FIELD

This invention relates generally to dumping devices, and more particularly to those dumping devices in which the load container may rotate relative to its support structure.

BACKGROUND

Dumping devices are generally used to transport loads, or to temporarily store loads. Such devices usually consist of a container attached to a support structure. They may be small scale devices, such as the garden carts used to transport such items as dirt, leaves, and grass clippings. On a larger scale, dumping devices encompass wheelbarrows used by construction workers to carry materials such as concrete, bricks, and rocks. Although some dumping devices are wheeled carriers, others are not, i.e., containers in which concrete may be mixed prior to its unloading.

Most prior known dumping devices require that the support structure to which the container is attached be lifted from one end in order to dump the contents of the container. In the case of manually operated dumping devices, this may require a great deal of strength on the part of the operator. Such activity may become physically hazardous. Even where the dumping device is mechanically operated, emptying the container may still consume a great amount of energy.

Dumping devices wherein the container may rotate relative to the support structure are known in the art. Most of these inventions still require the operator or operating means to overcome the force of gravity when causing the container to dump its load. The dumping hand cart disclosed in U.S. Pat. No. 3,178,228 makes some use of a gravitationally unbalanced container which may be more easily rotated. However, the disclosure teaches a device which pushes the container from behind its center of gravity, and thus does not take full advantage of the container's unstable position. Similarly, the dumping wheelbarrow disclosed in U.S. Pat. No. 3,092,418, while also employing a gravitationally unbalanced container, discloses a rigid rod which pulls on the container. Because of the structure of the rod and the relatively small torque it generates, that invention is mechanically and ergonomically inefficient.

In contrast, the present invention utilizes a container maintained in an unstable rotational equilibrium, where the rotation of the container is controlled by an actuator exerting a force forward and above the center of gravity of the container. This results in a device which requires little force to initiate forward rotation of the container, as well as a more efficient means of controlling the container's rotation. Further, this device encompasses a number of actuators, such as a rotatably connected lever and link system, which increase ergonomic efficiency.

SUMMARY OF THE INVENTION

The present invention is for a dumping device. It is an object of this invention to provide a device which can unload its contents efficiently and with a minimum of applied force, and which can be easily maneuvered between its upright loading position and tilted dumping position. The device comprises a container rotatably connected to a support structure, so that the axis of rotation is located below and/or behind the center of gravity of the container. This creates an unstable gravitational equilibrium through which the container tends to rotate forward. A releasable stopping means is provided whereby the container is maintained in its upright loading position until the operator wishes to empty its contents. At least one actuator is provided which exerts a force forward of the container's center of gravity, whereby the operator may initiate the forward rotation of the container into its tilted dumping position, control the speed of rotation of container, and restore the container to its upright position.

DESCRIPTION OF SPECIFIC EMBODIMENTS

The invention comprises a container held by a support in an unstable rotational equilibrium. The container is maintained in the upright loading position by a releasable stop, which prevents forward rotation of the container. When the container is released from the stop, gravity or other external forces cause it to tilt forward, unloading its contents. At least one actuator transmits a force to the container forward of the container's axis of rotation, permitting forward or rearward rotation of the container. Alternatively, the actuator may be used to enhance and control the container's forward rotation.

The container may assume different forms depending on the purpose for which it is to be used and on production concerns. For example, in one embodiment, the container may be a rectangular box shape. In another embodiment, the container may have an obtusely angled front portion. Another embodiment would comprise a rounded container. The container may also be constructed from a variety of materials, such as plastic, metal, wood, or some combination thereof.

The container is rotatably connected to a support. One embodiment of the invention has the support structured as a first and second support. A further modification embodies a right and left side frame. This embodiment may be further modified by having structural members connecting the right and left side frame supports. Another embodiment may have the supports structured from solid sheets of materials. Different materials, such as plastic, metal, wood, or a combination thereof, may be used to construct the supports to suit utility and production needs.

Figure 1:
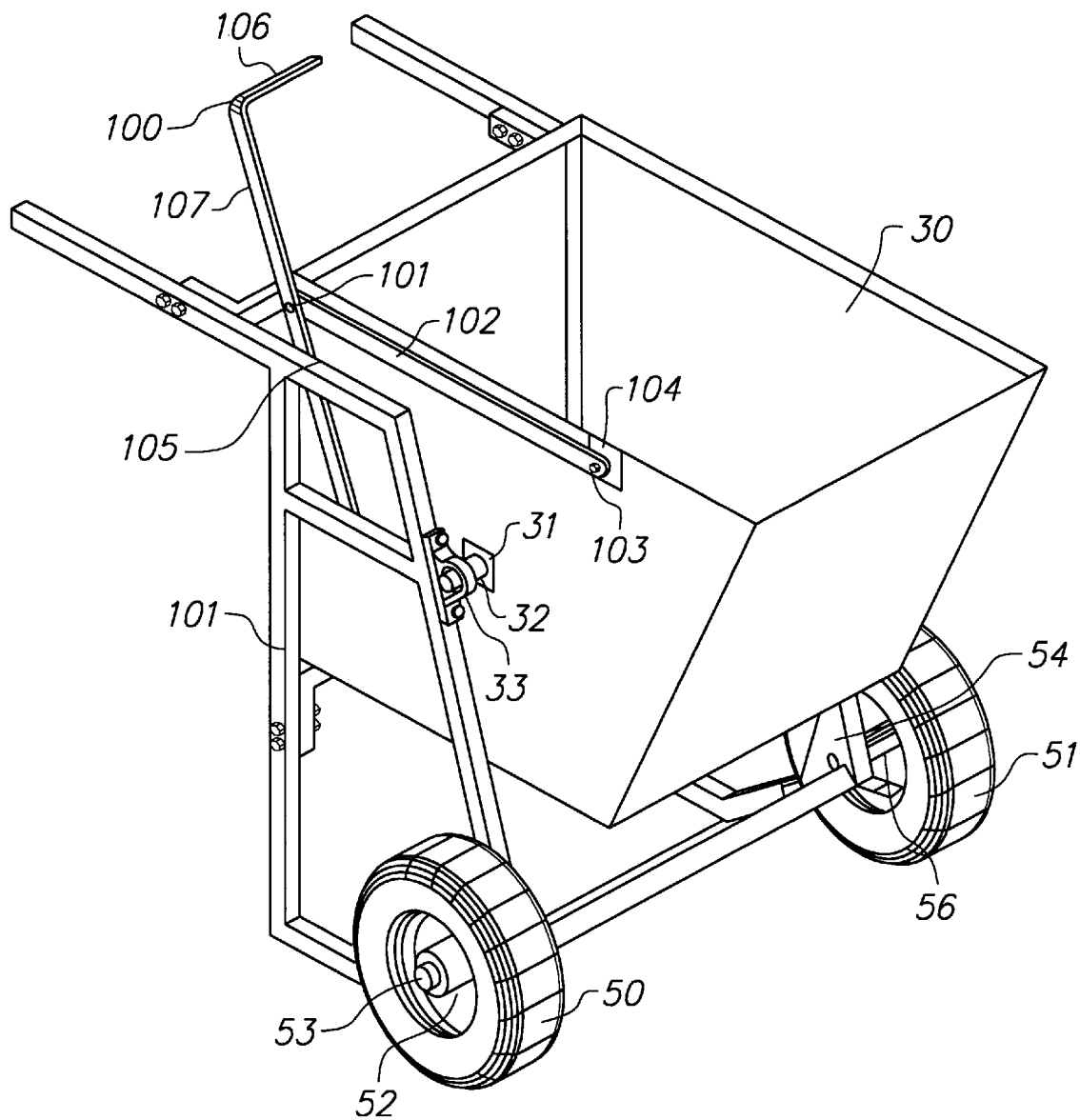
FIG. 1 is a perspective view of an embodiment of the device.
Figure 2:
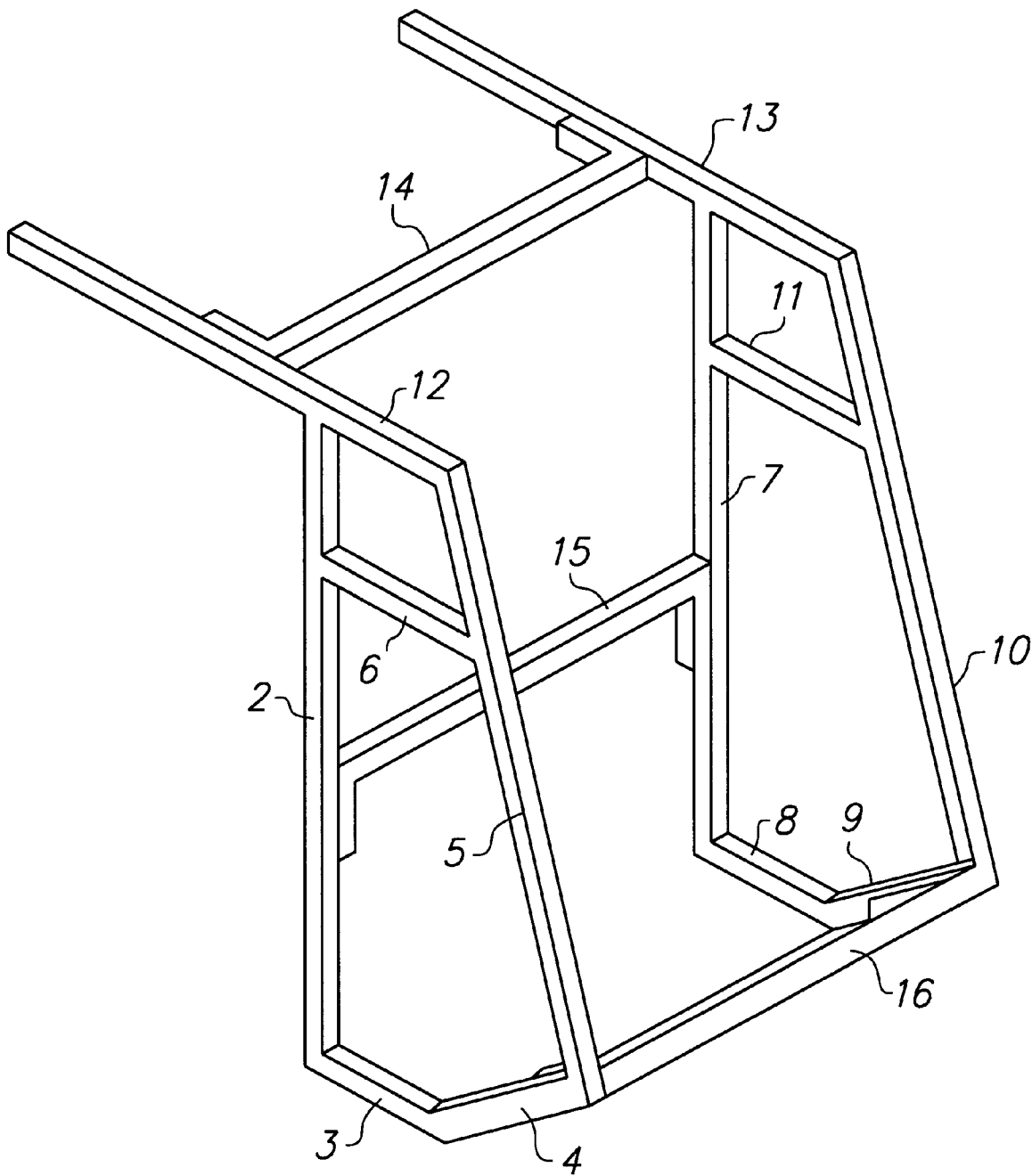
FIG. 2 is a perspective view of the support structure of the embodiment.

The embodiment shown in FIG. 1 comprises metal container 30 disposed within metal support structure 1. As shown in FIG. 2, the support structure comprises a right and left side frame. Each side frame comprises 3 horizontal members (3, 6, and 12 and 8, 11, and 13). Each of the 3 horizontal members is welded to a rear vertical member (2 and 7). Each of the two uppermost horizontal members (6, 12, 11, and 13) is welded to an upper inclining member (5 and 10). Each lower horizontal member (3 and 8) is welded to a lower inclining member (4 and 9). The right and left side frames are joined by horizontal struts 14, 15, and 16. The uppermost horizontal members (12 and 13) extend rearward past uppermost horizontal strut 14, forming handles which facilitate movement of the device.

In one possible embodiment the support or supports are located rearward of the center of gravity of the container.

This creates an axis of rotation for the container positioned such that, in the upright position, the container is in an unstable equilibrium with a tendency to rotate forward. In another embodiment, the support or supports are located below the center of gravity of the container, so that in the upright position the container can be tilted forward by a relatively small amount of force applied forward of its center of gravity. In the embodiment pictured in the drawings, the container is attached to the side frames, rearward of its center of gravity, through identical shaft and bearing mechanisms. FIG. 1 shows the right side shaft mechanism: the shaft is welded to shaft reinforcement plate 31, which is welded to the container at a point rearward of the center of gravity. The shaft is encased by bearing sleeve 32, and is held in place by set screws on the bearing sleeve. The bearing is supported on the frame by pillow block mount 33. An identical shaft and bearing mechanism is located on the left side of the container connecting it to the left side frame.

At least one actuator is used to apply a force to the container at a point forward of and above its center of gravity. An actuator may be used to move the container to its tilted dumping position. Alternatively, an actuator may be used to return the container to its upright loading position. The actuators which control forward and rearward rotation of the container may be one and the same. An actuator may be used to control the speed of the forward rotation of the container, or may be used to control the degree to which the container rotates, or both. The force applied may be one or more of the followings mechanical, electrical, or magnetic, or any other force known in the art. Possible embodiments of an actuator may include a lever and link mechanism, a gear or gears, a cable and pulley apparatus, a spring or springs, a hydraulic system, an electromagnet, or any other appropriate device as may be known in the art.

Figure 3:
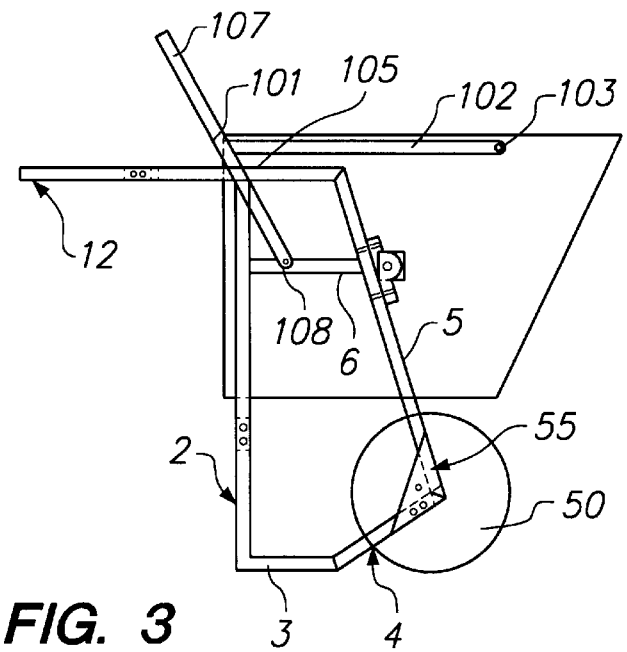
FIG. 3 is a view of the right side of the embodiment.
Figure 4:
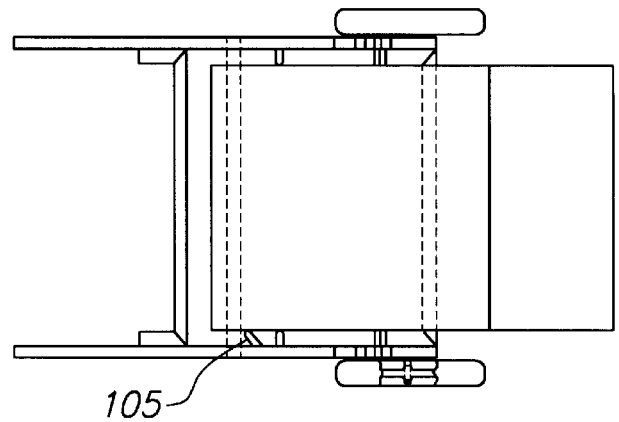
FIG. 4 is top view of the embodiment.

An embodiment of a single actuator which controls both forward and rearward rotation of the container is shown in FIG. 3. This embodiment is a driver/coupler lever mechanism. Driver lever 100 comprises lever arm 107 and handle 106. Lever arm 107 is rotatably connected to coupler link 102 by shaft and cotter pin assembly 101 at the lever arm's approximate midpoint. Coupler link 102 is rotatably connected to the container by shaft and cotter pin assembly 103 welded to reinforcement plate 104 which is welded to the container. The lower end of the driver lever is rotatably connected to horizontal frame member 6 by shaft and cotter pin assembly 108. In the loading position, lever arm 107 is forwardly engaged by metal latch plate 105, which is welded to horizontal side frame member 12, as shown in FIG. 4. To unload the container, driver lever 100 is pulled rearwards and inwards, releasing lever arm 107 from latch plate 105. The speed of rotation of the container is controlled manually by force exerted on handle 106. To return the container to its loading position, the operator pulls rearward on handle 106, and moves lever arm 107 back to its original engaged position behind latch plate 105.

In the device shown in the drawings, latch plate 105 protrudes from the frame and serves as a releasable stop by which the container is prevented from rotating. Other embodiments of a releasable stop may include different forms of protrusions from a frame or other support. Alternatively, a releasable stop may be provided by any of a number of mechanical devices, such as a hook and eye device or a sliding bolt. A releasable stop may act directly from frame to container, or through an intermediate, such as the driver lever in the pictured embodiment. A releasable stop may also take the form of an electrical or magnetic device or series of devices, or other methods as may be known in the art. A releasable stop could also be used to restrain the container in its dumping position.

Figure 5:
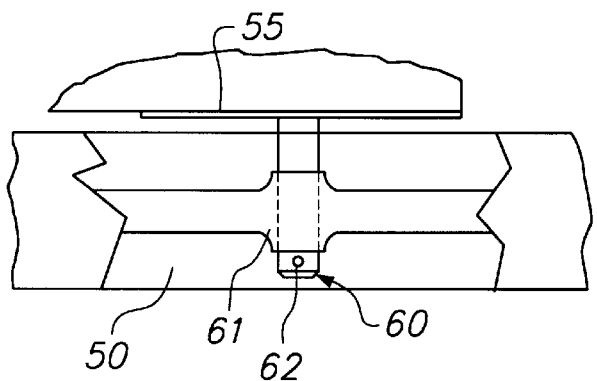
FIG. 5 is a fragmentary view of wheel assembly of the embodiment.

The utility of the device may be greatly facilitated by increasing the device's mobility through the use of transport means attached directly or indirectly to the supports. These transport means may include one or more wheels. FIGS. 1, 3, 4, and 5 illustrate the attachment of pneumatic wheels 50 and 51 to the device. FIGS. 3 and 5 show right wheel 50 mounted by means of wheel shaft 60 which passes through wheel hub 61 and held in place by cotter pin 62. Wheel shaft 60 is welded to wheel plate 55, which is bolted to right frame member 4. Left wheel 51 is attached in an identical manner to the left frame member 9.

All publications and patent applications mentioned in this specification are herein incorporated by reference to the same extent as if each individual publication or patent application was specifically and individually indicated to be incorporated by reference.

The invention now being fully described, it will be apparent to one of ordinary skill in the art that many changes and modifications can be made thereto without departing from the spirit or scope of the appended claims.

What is claimed is:

1. A garden cart, comprising:

a container maintained in unstable rotational equilibrium, having a bottom portion, a front wall, a rear wall, a first side wall, and a second side wall;

a support structure, said support structure including a first side frame and a second side frame stably joined by at least one horizontal strut, and said first and second side frames rotatably connected to said first and second side walls, respectively, so as to create an axis of rotation located rearward of the center of gravity of said container;

a transport means comprising at least one ground-engaging wheel, said transport means coupled to said support structure;

a lever mechanism for rotating said container forward about said axis of rotation into a dumping position, wherein said lever mechanism comprises a driver lever and a coupler link, said driver lever having an upper end, said link having a front end and a rear end, said driver lever being rotatably connected to one of said frames, said rear end of said link being rotatably connected to said driver lever at a point between said upper end of said driver lever and said rotatable connection to said frame, said front end of said link being rotatably connected to said container at a point forward of and above said axis of rotation, wherein said link is positioned parallel to said upper edge when said driver lever is forwardly engaged by said protrusion; and at least one releasable stop for preventing said forward rotation of said container, wherein said releasable stop comprises a protrusion from said frame, said protrusion forwardly engaging said driver lever, said driver lever remaining so engaged until pulled rearwardly and away from said frame, whereby said driver lever is freed to allow forward movement.

2. The garden cart of claim 1, further comprising a first handle extending rearward from said first frame side and a second handle extending rearward from said second frame side.

3. The garden cart of claim 1, wherein said container is comprised of metal.

4. The garden cart of claim 1, wherein said support is comprised of metal.

5. The garden cart of claim 1, wherein said container is comprised of plastic.

6. The garden cart of claim 1, wherein said support is comprised of plastic.

7. The garden cart of claim 1, wherein said container has a rounded bottom.

8. A garden cart, comprising:
a container maintained in unstable rotational equilibrium, having a bottom portion, a front wall, a rear wall, a first side wall, and a second side wall;
a support structure, said support structure including a first side frame and a second side frame stably joined by at least one horizontal strut, and said first and second side frames rotatably connected to said first and second side walls, respectively, so as to create an axis of rotation located below the center of gravity of said container;
a transport means comprising at least one ground-engaging wheel, said transport means coupled to said support structure;
a lever mechanism for rotating said container forward about said axis of rotation into a dumping position, wherein said lever mechanism comprises a driver lever and a coupler link, said driver lever having an upper end, said link having a front end and a rear end, said driver lever being rotatable connected to one of said frames, said rear end of said link being rotatably connected to said driver lever at a point between said upper end of said driver lever and said rotatable connection to said frame, said front end of said link being rotatably connected to said container at a point forward of and above said axis of rotation, wherein said link is positioned parallel to said upper edge when said driver lever is forwardly engaged by said protrusion; and
at least one releasable stop for preventing said forward rotation of said container, wherein said releasable stop comprises a protrusion from said frame, said protrusion forwardly engaging said driver lever, said driver lever remaining so engaged until pulled rearwardly and away from said frame, whereby said driver lever is freed to allow forward movement.

9. A wheelbarrow, comprising:
a container maintained in unstable rotational equilibrium, having a bottom portion, a front wall, a rear wall, a first side wall, and a second side wall;
a support structure, said support structure including a first side frame and a second side frame stably joined by at least one horizontal strut, and said first and second side frames rotatably connected to said first and second side walls, respectively, so as to create an axis of rotation located rearward of the center of gravity of said container;
a transport means comprising at least one ground-engaging wheel, said transport means coupled to said support structure;
a lever mechanism for rotating said container forward about said axis of rotation into a dumping position, wherein said lever mechanism comprises a driver lever and a coupler link, said driver lever having an upper end, said link having a front end and a rear end, said driver lever being rotatably connected to one of said frames, said rear end of said link being rotatably connected to said driver lever at a point between said upper end of said driver lever and said rotatable connection to said frame, said front end of said link being rotatably connected to said container at a point forward of and above said axis of rotation, wherein said link is positioned parallel to said upper edge when said driver lever is forwardly engaged by said protrusion; and
at least one releasable stop for preventing said forward rotation of said container, wherein said releasable stop comprises a protrusion from said frame, said protrusion forwardly engaging said driver lever, said driver lever remaining so engaged until pulled rearwardly and away from said frame, whereby said driver lever is freed to allow forward movement.

10. A garden cart, comprising:
a container maintained in unstable rotational equilibrium, having a bottom portion, a front wall, a rear wall, first side wall, and a second side wall;
a support structure, said support structure including a first side frame and a second side frame stably joined by at least one horizontal strut, and said first and second side frames rotatably connected to said first and second side walls, respectively, so as to create an axis of rotation located rearward of the center of gravity of said container;
a ground engaging transport means coupled to the support structure;
a lever mechanism for rotating said container forward about said axis of rotation into a dumping position, wherein said lever mechanism comprises a driver lever and a coupler link, said driver lever comprising a lever arm and a handle, said lever arm being rotatably connected to said coupler link by a first shaft and cotter pin assembly at a midpoint of said lever arm, said coupler link being rotatably connected to said container by a second shaft and cotter pin assembly, said driver lever being rotatably connected to said support by a third shaft and cotter pin assembly; and
at least one releasable stop for preventing said forward rotation of said container, wherein said releasable stop is at least one latch plate protruding from at least one of said frames and releasably engaging the driver lever.

11. A garden cart, comprising:
a container maintained in unstable rotational equilibrium, having a bottom portion, a front wall, a rear wall, first side wall, and a second side wall;
a support structure, said support structure including a first side frame and a second side frame stably joined by at least one horizontal strut, and said first and second side frames rotatably connected to said first and second side walls, respectively, so as to create an axis of rotation located below the center of gravity of said container;
a ground engaging transport means coupled to the support structure;
a lever mechanism for rotating said container forward about said axis of rotation into a dumping position, wherein said lever mechanism comprises a driver lever and a coupler link, said driver lever comprising a lever arm and a handle, said lever arm being rotatably connected to said coupler link by a first shaft and cotter pin assembly at a midpoint of said lever arm, said coupler link being rotatably connected to said container by a second shaft and cotter pin assembly, said driver lever being rotatably connected to said support by a third shaft and cotter pin assembly; and
at least one releasable stop for preventing said forward rotation of said container, wherein said releasable stop is at least one latch plate protruding from at least one of said frames and releasably engaging the driver lever.

* * * * *